United States Patent [19]

Luque

[11] Patent Number: 4,538,476
[45] Date of Patent: Sep. 3, 1985

[54] CURSOR CONTROL ASSEMBLY

[76] Inventor: Tom. R. Luque, 22000 Romar St., Chatsworth, Calif. 91311

[21] Appl. No.: 493,823

[22] Filed: May 12, 1983

[51] Int. Cl.³ .............................................. G05G 9/04
[52] U.S. Cl. ................................ 74/471 XY; 74/198; 273/148 B; 340/710; 338/128
[58] Field of Search ................. 74/198, 206, 471 XY; 340/710; 273/148 B; 16/26; 338/128

[56] References Cited

U.S. PATENT DOCUMENTS

| 2,585,120 | 2/1952 | Harrington, Jr. | 74/198 |
| 3,013,441 | 12/1961 | Alexander | 74/198 X |
| 3,267,755 | 8/1966 | Isely | 74/198 |
| 3,269,190 | 8/1966 | Laman | 74/198 X |
| 3,304,434 | 2/1967 | Koster | 250/231 SE |
| 3,395,589 | 8/1968 | Gersten | 74/198 X |
| 3,541,521 | 11/1970 | Koster | 364/512 |
| 3,541,541 | 11/1970 | Engelbart | 340/710 |
| 3,625,083 | 12/1971 | Bose | 74/471 XY |
| 3,643,148 | 2/1972 | Brown et al. | 74/471 XY X |
| 3,835,464 | 9/1974 | Rider | 74/198 X |
| 3,987,685 | 10/1976 | Opocensky | 74/198 X |
| 4,404,865 | 9/1983 | Kim | 74/471 XY |

FOREIGN PATENT DOCUMENTS 1225254 2/1960 France .................. 74/198

Primary Examiner—Allan D. Herrmann
Attorney, Agent, or Firm—Fulwider, Patton, Rieber, Lee & Utecht

[57] ABSTRACT

An improved ball-type cursor control assembly is provided for controlling the position of a cursor or the like within the field of a video display. The control assembly comprises two orthogonally spaced rotatable traction wheels for supporting the ball at two points substantially at the horizontal equator of the ball and a rolling bearing positioned generally equidistant between the traction wheels to frictionally support the ball at a point substantially below the horizontal ball equator. The traction wheels and rolling bearing thus define three contact points lying within a common plane canted relative to the horizontal ball equator to permit the traction wheels to be positioned to contact the ball substantially at or slightly below said equator. In one preferred form, the traction wheels and rolling bearing are mounted on support brackets upstanding from a support platform having a central opening therein through which a portion of the ball extends thereby permitting the platform to be positioned in a plane less than one ball radius from the horizontal equator of the ball.

8 Claims, 4 Drawing Figures

CURSOR CONTROL ASSEMBLY

BACKGROUND OF THE INVENTION

This invention relates generally to ball-type control assemblies and devices for controlling the position of a cursor or the like over the field of a video display. More specifically, this invention relates to an improved and relatively simplified ball-type cursor control assembly, particularly of the type for use with video arcade games and the like, wherein the assembly includes improved force coupling between the control ball and position-responsive signalling devices.

Ball-type cursor control assemblies are well known for use with video displays, such as electronic tracking equipment, arcade games, and the like. Such ball-type cursor control assemblies typically includes a relatively freely rotatable control ball supported for rolling movement in frictional engagement with two or more traction devices in the form of wheels, shafts, and the like to rotate said traction devices about horizontal axes in response to rolling movement of the control ball. These traction devices are in turn coupled to appropriate signal generation components which provide electrical output signals for controlling the position of the cursor within the field of the video display, typically in terms of Cartesian coordinates. These signal generation components may take a variety of known forms, such as, for example, adjustable potentiometers as disclosed in U.S. Pat. Nos. 3,541,541 and 3,835,464, or a generator device as disclosed in U.S. Pat. No. 3,267,755, or light signal devices as described in U.S. Pat. Nos. 3,541,521 and 3,304,434.

In general, in a ball-type cursor control assembly, it is desirable to position the traction devices for contact with the control ball substantially at the horizonal equator or centerline of the ball thereby permitting adjustment of the cursor position along one Cartesian axis without alteration in the cursor position along the other axis. Moreover, such positioning of the traction devices has been found to substantially optimize force transfer between the control ball and the traction devices without slippage as a result of the directional force vectors acting therebetween. However, when the traction devices contact the horizontal equator of the ball, the traction devices are incapable of vertically supporting the ball. Instead, some additional support structure is required, as disclosed by way of example in U.S. Pat. Nos. 3,835,464; 3,625,083; and 3,269,190, which inreases the number of components in the control assembly and thus also increases the cost of the control assembly. In addition, the added support structure tends to increase frictional resistance to ball rotation wherein this increased friction can result in undesired ball slippage or require the use of relatively expensive yet low friction signal generation components, such as light signal devices, in lieu of less expensive but higher friction components, such as adjustable potentiometers.

Alternative control ball support techniques have been proposed to eliminate the additional support structure below the control ball by supporting the ball upon three or more rolling surfaces contacting the ball at points sufficiently below the horizontal ball equator, wherein two of these rolling surfaces comprise a pair of traction devices and a third rolling surface typically comprises a rolling bearing. Positioning these rolling surfaces below the horizontal ball equator advantageously permits these surfaces to lie on a radius sufficiently smaller than the ball radius to provide vertical support for the ball. However, in the past, downward forces applied to the control ball during use have tended to spread slightly the three rolling surfaces whereby such surfaces have been required to be positioned substantially below the horizontal ball equator where rotation of the ball in any direction necessarily results in at least some rotation of both traction devices thereby making it impossible to move the cursor accurately along one Cartesian axis.

There exists, therefore, a significant need for an improved ball-type cursor control assembly having rotatable traction devices positioned for contacting and vertically supporting a control ball at points substantially at the horizontal ball equator, wherein the control assembly does not require additional support structures positioned below the control ball. The present invention fulfills this need and provides further related advantages.

SUMMARY OF THE INVENTION

In accordance with the invention, an improved ball-type cursor control assembly is provided having a control ball supported in rolling engagement with a pair or orthogonally displaced traction wheels coupled to cursor control signal generation components and a rolling bearing positioned on the side of the control ball generally opposite the traction wheels and generally angularly equidistant therebetween. The traction wheels and the rolling bearing are supported from a support platform for rotation about respective horizontal axes and are oriented vertically to contact the control ball at three contact points lying in a common plane which is canted relative to the horizontal equator of the ball and pases through the ball vertically below the ball's center. In particular, the traction wheels are positioned to contact the ball substantially at the horizontal ball equator whereas the rolling bearing is positioned to contact the control ball substantially below the horizontal equator. With this construction, the diameter of a circle circumscribing the three contact points is less than the ball diameter whereby the traction wheels and the rolling bearing cooperate to vertically support the ball against downward forces applied to the ball during use. Importantly, the traction wheel contact points lie substantially at the horizontal ball equator for accurate cursor adjustment along Cartesian coordinates and high force transfer between the ball and the traction wheels.

In a preferred form, the support platform comprises a generally rigid structural base mounted within or forming a part of a housing for the control assembly. This support platform is formed with a central opening therein through which a lower segment of the control ball may project thus permitting the platform to be positioned vertically above the lowermost point on the control ball, or alternately stated, at a position less than one radius of the ball below the horizontal ball equator. With this arrangement, the traction wheels and rolling bearing may be supported by relatively short support brackets, which conveniently may be struck upwardly from the support platform, to minimize any radially outward deflection of the support brackets when a downward force is applied to the control ball thereby accommodating traction wheel contact substantially at the horizontal ball equator.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
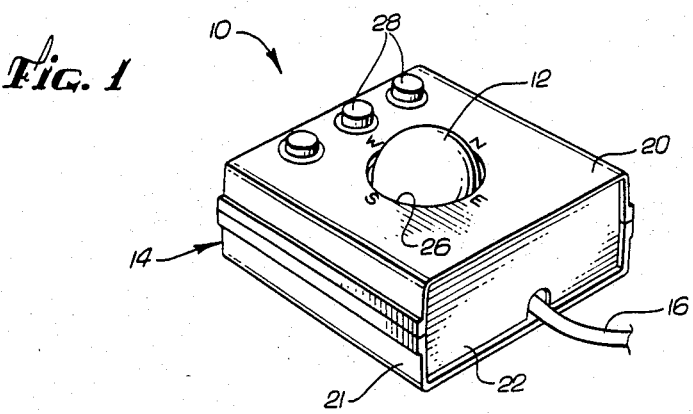
FIG. 1 is a perspective view illustrating an improved ball-type cursor control assembly embodying the novel features of the present invention.
Figure 2:
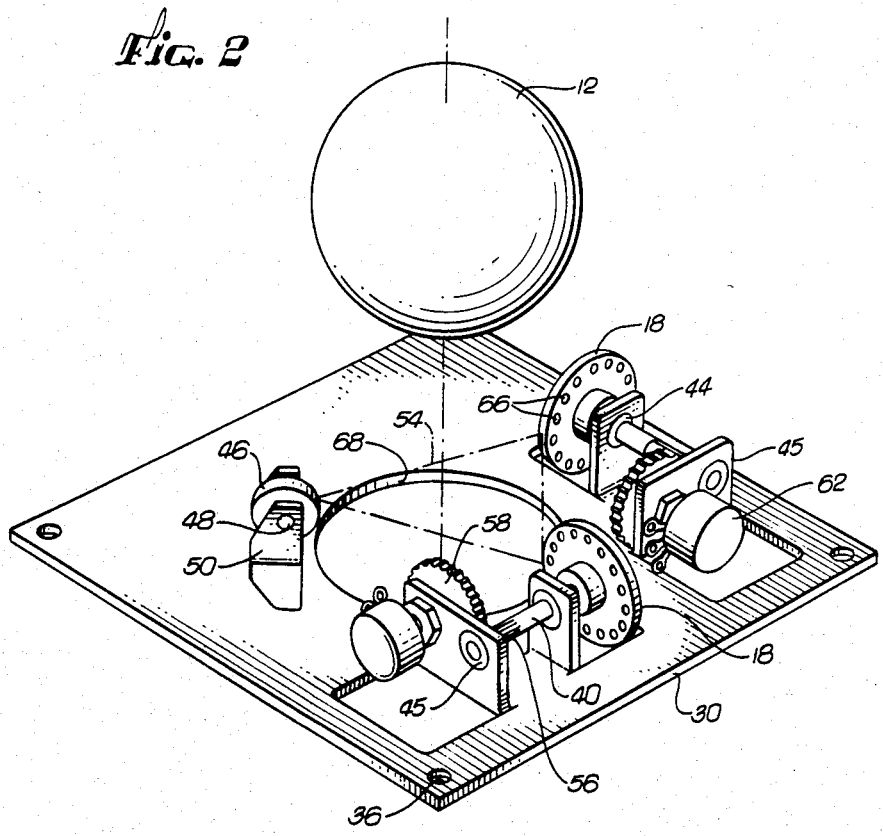
FIG. 2 is an enlarged exploded perspective view of a portion of the control assembly illustrating construction details thereof.

As shown in the exemplary drawings, an improved ball-type cursor control assembly referred to generally by the reference numeral 10 is provided for use in controlling the position of a cursor (not shown) or the like within the field of a video display, such as the video display of an arcade game or the like. The control assembly 10 includes a spherical control ball 12 rotatably supported within a housing 14 with an upper portion of the ball 12 exposed for manual rotation of the ball relative to the housing. Such rotation, as is known in the art, operates signal generating components (not shown in FIG. 1) within the housing to provide electrical signals which are coupled to the video display via an appropriate conductor 16 or the like to control the position of the cursor, typically in terms of Cartesian coordinates within the field of the video display.

The ball-type cursor control assembly of the present invention provides a significant improvement upon conventional ball-type control assemblies in that rotatable traction wheels 18 within the housing 14 are positioned to contact the ball 12 at points substantially at the horizontal equator or centerline of the ball, whereby the traction wheels 18 perform the dual functions of providing vertical ball support and mechanical couplings to the signal generating components. This arrangement provides a simplified and therefore inexpensive support structure which advantageously locates the ball-traction wheel contact points at or sufficiently close to the horizontal ball equator for highly accurate cursor position adjustment in response to ball rotation and relatively optimized force transfer between the ball and the traction wheels.

Figure 3:
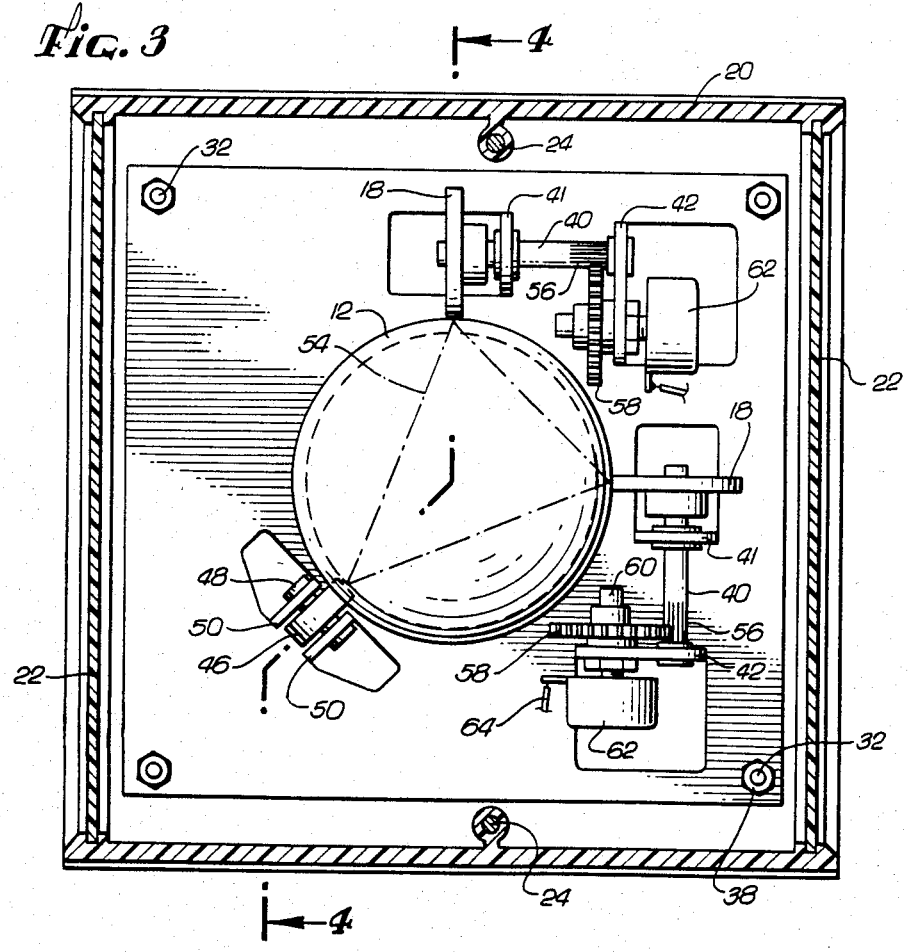
FIG. 3 is an enlarged horizontal section of the control assembly.

As shown in one preferred form in FIGS. 1-4, the ball-type cursor control assembly 10 comprises the housing 14 illustrated to include matingly interfitting and shell-shaped upper and lower housing halves 20 and 21, which support a pair of end plates 22 and which are adaped for connection together as by screws 24 (FIG. 3). The control ball 12 is supported vertically upon a ball support structure to be hereinafter described including the traction wheels 18 in a position such that an upper portion of the ball projects upwardly through a central opening 26 in the upper housing 20. Indicia as viewed in FIG. 1 may be imprinted on the upper housing half 20 to reference ball rotation with movement of the cursor, and control switches or buttons 28 may also be supported on the upper housing half 20, if desired.

The support structure for the ball 12 comprises a support platform 30 disposed, in the illustrative embodiment, within the housing 14, As shown, this support platform 30 has a generally rectangular shape which can be formed from a metal stamping or molded plastic or the like and is mounted with respect to the lower housing half 21 by four threaded shafts 32 having their lower ends secured into bosses 34 on the lower housing half 21 and their upper ends received through holes 36 formed respectively near the four corners of the platform. Nuts 38 are provided in pairs above and below the platform 30 to permit the platform to be tightly clamped therebetween and supported in a horizontal plane located at a desired vertical position within the housing.

The support platform 30 provides a rigid support base for mounting of the two traction wheels 18 at generally orthogonally spaced positions. More particularly, each traction wheel 18 is supported for rotation with a relatively short shaft 40 which is in turn supported for rotation about a horizontal axis by an associated pair of support brackets 41 and 42 conveniently upstruck from the support platform 30. Ball bearing assemblies 44 and 45 may be provided to minimize rotational friction of the shafts 40.

The support platform 30 additionally provides a rigid support base for a rolling bearing 46 which cooperates with the traction wheels 18 to vertically support the control ball 12. More particularly, the rolling bearing 46 may comprise a low friction ball or roller bearing assembly and is positioned for contacting the control ball 12 generally at a side opposite the two orthogonally spaced traction wheels and at a position spaced generally angularly equidistant between the traction wheels. The rolling bearing 46 is supported by a stub shaft 48 which is in turn held for rotation about a horizontal axis by a pair of support brackets 50 upstruck from the support platform.

Figure 4:
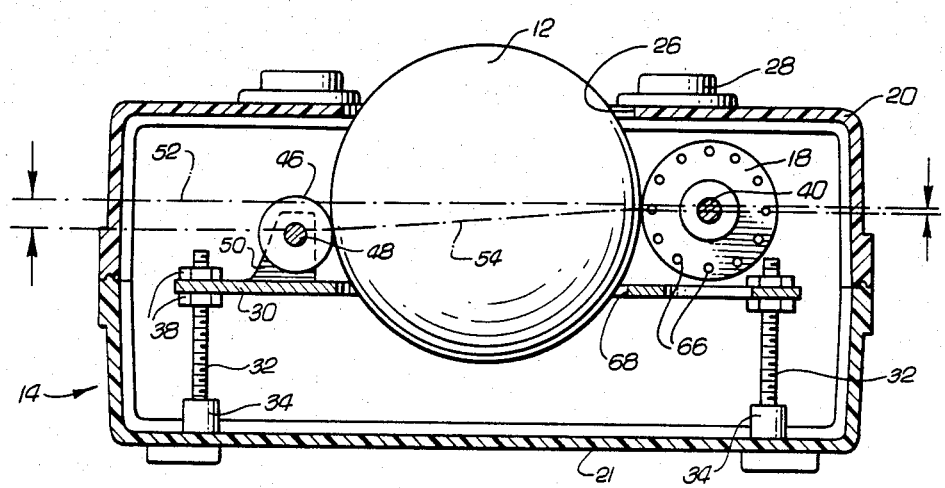
FIG. 4 is an enlarged vertical section taken generally on the line 4—4 of FIG. 3.

In accordance with a primary aspect of the present invention, the two traction wheels 18 are disposed to contact the control ball 12 at two orthogonally spaced points located substantially at the horizontal equator of the ball, as referred to by arrow 52 in FIG. 4, whereas the rolling bearing 46 is positioned to contact the support ball at a point substantially below the horizontal ball equator 52. The traction wheels 18 and the rolling bearing 46 thus together define the locations of three contact points lying in a common plane, as referenced by the dotted lines 54 in FIGS. 2-4, wherein this common plane 54 is canted relative to the horizontal ball equator 52 and passes through the ball vertically below the center of the ball. Moreover, the three contact points are thus located on a radius which is sufficiently less than the radius of the control ball 12 such that the ball cannot be pushed vertically downward past the traction wheels. Accordingly, the traction wheels can be arranged to contact the control ball substantially at the ball equator 52 while also contributing to vertical support of the ball.

In a preferred embodiment, wherein the traction wheels 18 are formed from a metal material, such as aluminum or the like, and the control ball 12 is formed from a high density plastic or the like of low compressibility, the traction wheels 18 were positioned to contact a two-inch diameter control ball at points approximately 0.10 inch below the horizontal ball equator and the rolling bearing 46 was positioned to contact the control ball approximately one-quarter inch below the horizontal ball equator, all as viewed best in FIG. 4. With this arrangement, the traction wheels 18 contacted the control ball substantially at the horizontal ball equator within manufacturing tolerance errors for accurate cursor tracking and control well within he margin of error permissible with arcade games. In addition, this positioning of the traction wheels results in relatively optimized frictional engagement between the ball and the traction wheels as a result of the directional force vectors acting therebetween and further as a result of the relatively lower rolling bearing 46 tending to tip the weight of the ball somewhat toward the traction wheels.

Traction wheel rotation, of course, imparts a rotation to the respective shafts 40. In the illustrative embodiment, these shafts 40 include gear teeth 56 which engage a reduction gear 58 mounted on the adjustment shaft 60 of an adjustable potentiometer 62. Accordingly, ball rotation translates to potentiometer adjustment which is coupled by leads 64 into an electrical circuit (not shown) for varying cursor position in response to potentiometer setting. Alternatively, other types of electrical signalling components and/or circuits may be used with the traction wheels, and in this regard, each traction wheel 18 advantageously is formed to include apertures 66 near its periphery for use with light signalling components, as shown in U.S. Pat. Nos. 3,541,521 and 3,304,434, if desired.

In accordance with a further feature of the invention, the traction wheels 18 are desirably formed to have a relatively narrow axial width and a relatively large diameter, preferably about one-half the diameter of the control ball 12. With this configuration, rotation of the control ball rotates the associated traction wheel 18 and its shaft 40 through a relatively large moment arm between the contact point and the axis of the shaft 40, thereby providing a relatively large mechanical advantage for force transfer therebetween without slippage of the ball relative to the traction wheel. Surface area contact between the ball and the traction wheel, however, is maintained at a minimum by the axially narrow wheel shape.

In accordance with still further features of the invention, the support platform 30 is mounted relatively close to the horizontal ball equator 52 to minimize the heights of the brackets supporting the traction wheels and the rolling bearing. More particularly, the support platform has a central opening 68 formed therein for downward passage therethrough of a portion of the control ball 12 thereby permitting the support platform to be positioned less than one radius of the ball from the ball equator 52. With this construction, when the ball is subjected to vertically downward forces during use, radially outward displacement of the traction wheels 18 is minimized by the relatively short height of the support brackets. This advantageously contributes to positioning of the traction wheels for contact with the ball close to the ball equator without fear of the ball being forced downwardly past the friction wheels.

The cursor control assembly 10 of this invention thus provides a relatively simple, and thus relatively inexpensive ball support structure adapted for relatively high force transfer between the control ball and supporting traction wheels which advantageously contact the ball substantially at the horizontal equator thereof for accurate cursor tracking control.

A variety of modifications and improvements to the cursor control assembly described herein are believed to be possible to one of ordinary skill in the art. For example, the assembly can be adapted for use with a variety of cursor-related devices and may be installed directly into an overall machine housing instead of the independent housing as illustrated in the accompanying drawings. Alternatively, the assembly may be installed in relation to a housing having the support platform as an integral portion of the housing. Accordingly, in view of the many and varied modifications possible, no limitation on the invention is intended, except as set forth in the appended claims.

What is claimed is:

1. A ball-type cursor control assembly for controlling the position of a cursor within the field of a video display, comprising:
    a control ball;
    a support platform;
    a pair of traction wheels rotatably supported by said support platform at orthogonally spaced positions for contacting and supporting said control ball;
    a rolling bearing rotatably supported by said support platform for contacting and supporting said control ball at a side thereof generally opposite said traction wheels and generally equidistant between said traction wheels;
    said traction wheels being positioned to contact said control ball at two respective contact points substantially at the horizontal equator of said control ball and said rolling bearing being positioned to contact said control ball at a third contact point substantially below said ball equator whereby said contact points lie in a common plane canted relative to said ball equator and passing below the center of the ball and wherein said contact points lie on a radius substantially less than the radius of said control ball; and
    means responsive to rotation of said traction wheels for controlling the position of said cursor within the field of the video display.

2. The cursor control assembly of claim 1 wherein said traction wheels each are relatively narrow in the axial direction and has a substantial diameter on the order of about one-half the ball diameter.

3. The cursor assembly of claim 2 wherein said traction wheels each have a plurality of apertures formed near the periphery thereof.

4. The cursor control assembly of claim 1 wherein said support platform includes a plurality of suppot brackets upstanding integrally therefrom for rotationally supporting said traction wheels and said rolling bearing.

5. The cursor control assembly of claim 4 wherein said support platform has a central opening formed wherein for downward reception therethrough of a portion of said control ball, whereby said support platform is disposed less than one radius of said control ball from the horizontal ball equator.

6. The cursor control assembly of claim 5 including means for mounting said support platform in a plane generally parallel with the horizontal ball equator.

7. The cursor control assembly of claim 6 including a housing, said support platform being mounted within said housing.

8. A ball-type cursor control assembly for controlling the position of a cursor within the field of a video display, comprising:
    a control ball;
    a support platform;
    a pair of traction wheels rotatably supported by said support platform at orthogonally spaced positions for contacting and supporting said control ball;

a rolling bearing rotatably supported by said support platform for contacting and supporting said control ball at a side thereof generally opposite said traction wheels and generally equidistant between said traction wheels;

said traction wheels being positioned to contact said control ball at two respective contact points substantially at the horizontal equator of said control ball and said rolling bearing being positioned to contact said control ball at a third contact point substantially below said ball equator whereby said contact points lie in a common plane canted relative to said ball equator and passing below the center of the ball and wherein said contact points lie on a radius substantially less than the radius of said control ball;

said support platform having a central opening formed therein for downward reception therethrough of a portion of said control ball;

means for mounting said support platform in a plane generally below the horizontal ball equator less than one radius of said control ball from the horizontal ball equator; and means responsive to rotation of said traction wheels for controlling the position of said cursor within the field of the video display.

* * * * *